United States Patent [19]

Nagasaka et al.

[11] Patent Number: 5,926,653
[45] Date of Patent: Jul. 20, 1999

[54] LENS-FITTED PHOTOGRAPHIC FILM UNIT HAVING A SHAPED OUTER CASE

[75] Inventors: Toshihide Nagasaka; Shuichi Ichino; Yoshio Ishizuka, all of Kanagawa; Makoto Isozaki, Tokyo, all of Japan

[73] Assignee: Fuji Photo Film Co., Ltd., Kanagawa, Japan

[21] Appl. No.: 08/799,364

[22] Filed: Feb. 14, 1997

Related U.S. Application Data

[63] Continuation of application No. 08/588,121, Jan. 18, 1996, abandoned.

[30] Foreign Application Priority Data

Jan. 24, 1995 [JP] Japan ..................................... 7-009099

[51] Int. Cl.$^6$ ................................................. G03B 17/02
[52] U.S. Cl. .............................. 396/6; 396/535; 396/540
[58] Field of Search ............................... 396/6, 535, 540; 206/316.1, 316.2; 473/550

[56] References Cited

U.S. PATENT DOCUMENTS

| 3,451,322 | 6/1969 | Noda et al. | 354/288 |
| 4,866,470 | 9/1989 | Arai et al. | 354/288 |
| 4,907,022 | 3/1990 | Myers | 354/76 |
| 4,907,810 | 3/1990 | Whiteford | 473/550 X |
| 5,381,200 | 1/1995 | Takagai | 354/250 |
| 5,436,685 | 7/1995 | Yamashina | 354/202 |
| 5,457,511 | 10/1995 | Kanai et al. | 354/154 |
| 5,537,176 | 7/1996 | Hara et al. | 396/6 |

*Primary Examiner*—Safet Metjahic
*Assistant Examiner*—J. K. Han
*Attorney, Agent, or Firm*—Young & Thompson

[57] ABSTRACT

A lens-fitted photographic film unit includes a unit body having at least a curved surface, such as a semi-cylindrical grip protruding forwardly from a front wall of the unit body. The unit body is wrapped in an outer case made of a sheet material. The sheet material is knurled or indented with a pattern in those portions of the outer case which are bent to cover the curved to impart flexibility thereto, or where the photographer grips the film unit.

10 Claims, 4 Drawing Sheets

5,926,653

LENS-FITTED PHOTOGRAPHIC FILM UNIT HAVING A SHAPED OUTER CASE

This application is a continuation of application Ser. No. 08/588,121, filed Jan. 18, 1996, now abandoned.

BACKGROUND OF THE INVENTION

1. Field of the Invention

The present invention relates to a lens-fitted photographic film unit, wherein a unit body containing a roll of photographic film has a taking lens and an exposure mechanism, and is encased in an outer case which is made of a blanked sheet material. And more particularly, the present invention relates to a lens-fitted photographic film unit whose unit body has at least a curved surface and whose outer case is improved in flexibility in a portion covering the curved surface of the unit body.

2. Background Art

Lens-fitted photographic film units, hereinafter referred to as film units, have been known as a kind of single-use preloaded camera which is affordable for everyone and permits enjoying photography with ease.

In view of the above use, it is desirable to make the film units as compact as possible. To minimize the thickness as well as improve the appearance, a film unit has a front wall that extends behind a taking lens and behind a front wall of a cylindrical film chamber containing a roll of unexposed photographic film. As the film chamber is disposed on the right of the taking lens, a protuberance having a semi-cylindrical shape, corresponding to the front wall of the film chamber, is formed as a grip on the front right of the unit body.

Since the film units must also be inexpensive, the unit body is wrapped with or encased in an outer case having an ornamental pattern printed thereon, in order to make the appearance more attractive at a low cost. The ornamental pattern further serves to indicate the type of the preloaded photographic film, the type of the taking lens, the format of the picture frame, the instructions how to use the film unit, and so forth. Moreover, the outer case prevents the dust from gathering on the unit body or entering inside the unit body. The outer cases are mostly made of cardboard and are formed by folding and sticking a blanked sheet of cardboard into a box.

However, the outer case of the film unit having a grip protruding from the front wall tends to separate from the unit body in the border between the front wall and the grip, because of the difference in thickness between the grip and the remaining portion of the unit body. Such a removal of the outer case will make the film unit insecure to hold. Furthermore, due to resiliency of the cardboard, the folded portions of the outer case tend to unfold, so the outer case tends to bulge or swell.

The bulged outer case cannot sufficiently protect the unit body from the dust, and also spoils the appearance of the film unit. If the outer case swells in the portion covering the grip, it also lowers reliability of grip.

OBJECT OF THE INVENTION

A primary object of the present invention is to provide a film unit which permits reliable gripping thereof.

Another object of the present invention is to provide a film unit wherein a unit body with a curved surface is tightly wrapped with an outer case made of a blanked sheet material, without the need for any complicated manufacturing steps of the outer case.

SUMMARY OF THE INVENTION

To achieve the above and other objects, the present invention processes a sheet material of an outer case in a portion where a curved surface of a unit body is covered, so as to improve flexibility of that portion.

According to a preferred embodiment, a plurality of grooves extending axially to the curved surface are provided in that portion of the outer case. The grooves may be provided by knurling or embossing.

The present invention also processes those portions of the outer case where the photographer grips the film unit, to increase the friction between the fingers and the film unit, and also decreases the stiffness and resiliency of the outer case in those portions, so the outer case may not swell off the unit body.

For a film unit having a semi-cylindrical grip which protrudes forwardly from a front wall of a unit body, the grooves are provided in a portion of the outer case covering the semi-cylindrical grip, so as to make the outer case tightly fit the grip and prevent the fingers from slipping.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
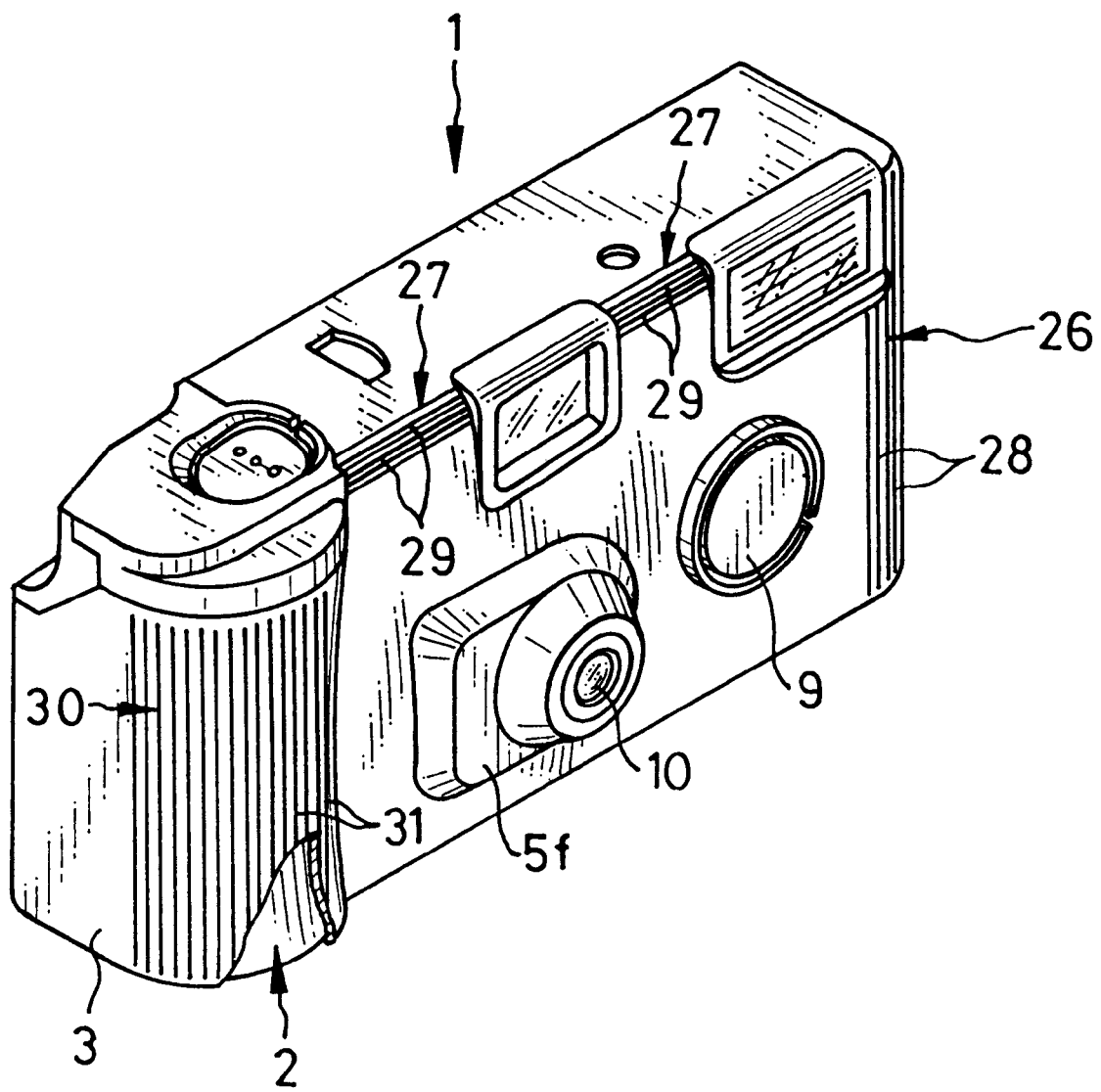
FIG. 1 is a perspective view of a film unit according to a first embodiment of the invention.

FIG. 1 shows a film unit according to a preferred embodiment of the invention. The film unit 1 is constituted of a substantially rectangular unit body 2 and an outer case 3 wrapping all sides of the unit body 2.

Figure 2:
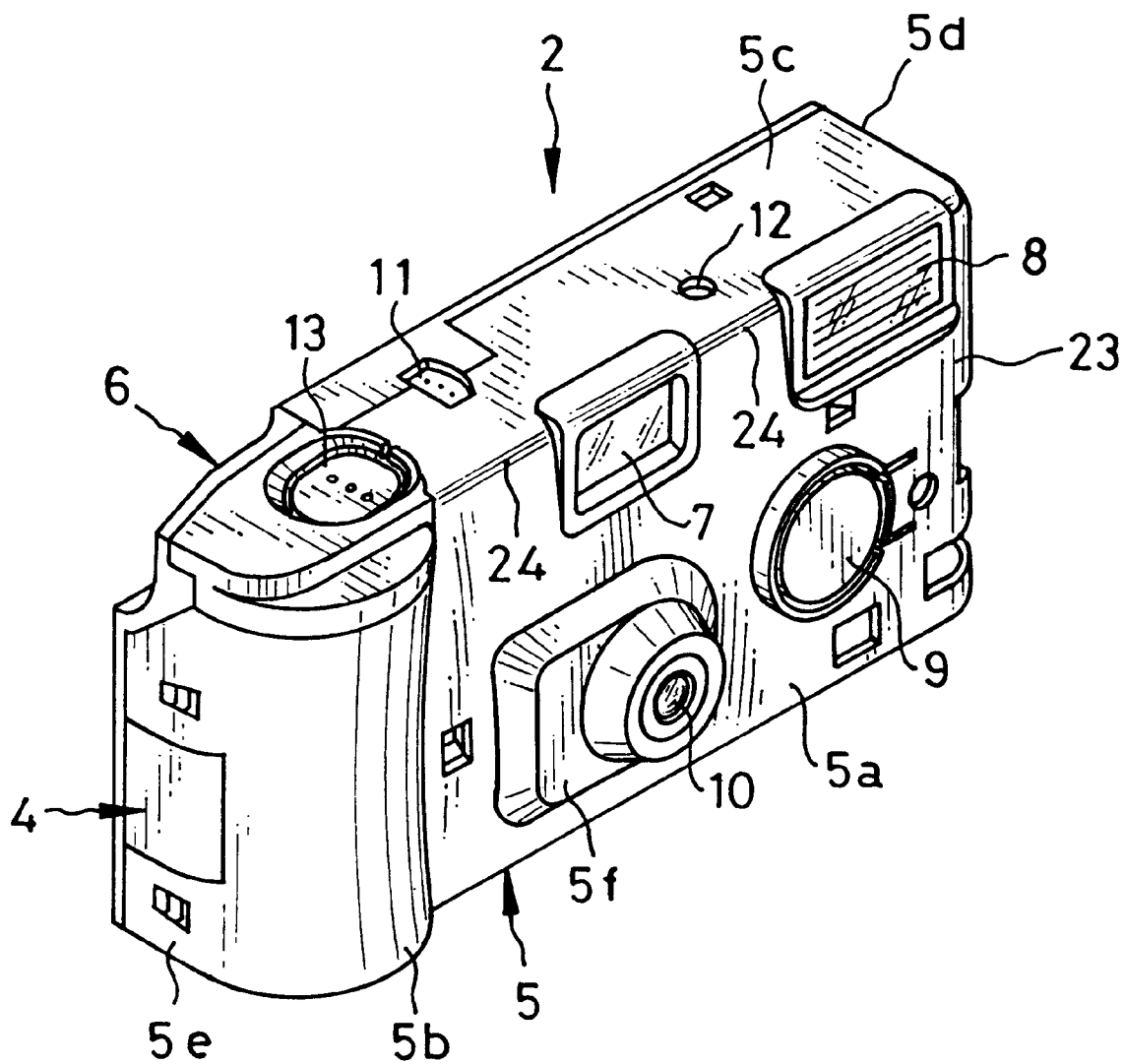
FIG. 2 is a perspective view of a unit body of the first embodiment.

As shown in FIG. 2, the unit body 2 is constituted of a main assembly 4 and front and rear covers 5 and 6 attached to the front and rear of the main assembly 4. The main assembly 4 has a not-shown film chamber of substantially cylindrical shape in which a roll of unexposed photographic film (not-shown) is contained. A taking lens 10, an objective window 7 of a viewfinder, a flash 8, and a flash charge button 9 are disposed on the front side of the unit body 2, whereas a frame counter 11, an indication lamp 12 for indicating the charge of the flash 8 and a shutter release button 13 are provided on the top side of the unit body 2.

The front cover 5 is a single-piece member constituting a front wall 5a, a grip 5b, a top wall 5c, side walls 5d and 5e, and a lens hood 5f of the unit body 2. The front wall 5a is gently convex in both horizontal and vertical directions. The grip 5b is formed on the right of the taking lens 10 and protrudes forwardly from the front wall 5a. The grip 5b has a substantially semi-cylindrical shape to fit with a not-shown front wall of the cylindrical film chamber of the main assembly 4, but is concave in the border area to the front wall 5a. The concavity of the grip 5b makes the film unit 1 more stable to hold. Also, two corners 23 and 24 between the front wall 5a and the left side wall 5d, as well as between the front wall 5a and the top wall 5c are rounded.

The outer case 3 has openings 15 to 19 for exposing the photographic elements 10, 9, 7, 12 and 11 of the unit body 2 to the outside, respectively. An opening 20 is provided for exposing a not-shown eyepiece window of the viewfinder. Also, cut-outs 21 and 22 are formed to expose the flash window 8 and the shutter release button 13 to the outside, respectively.

Figure 3:
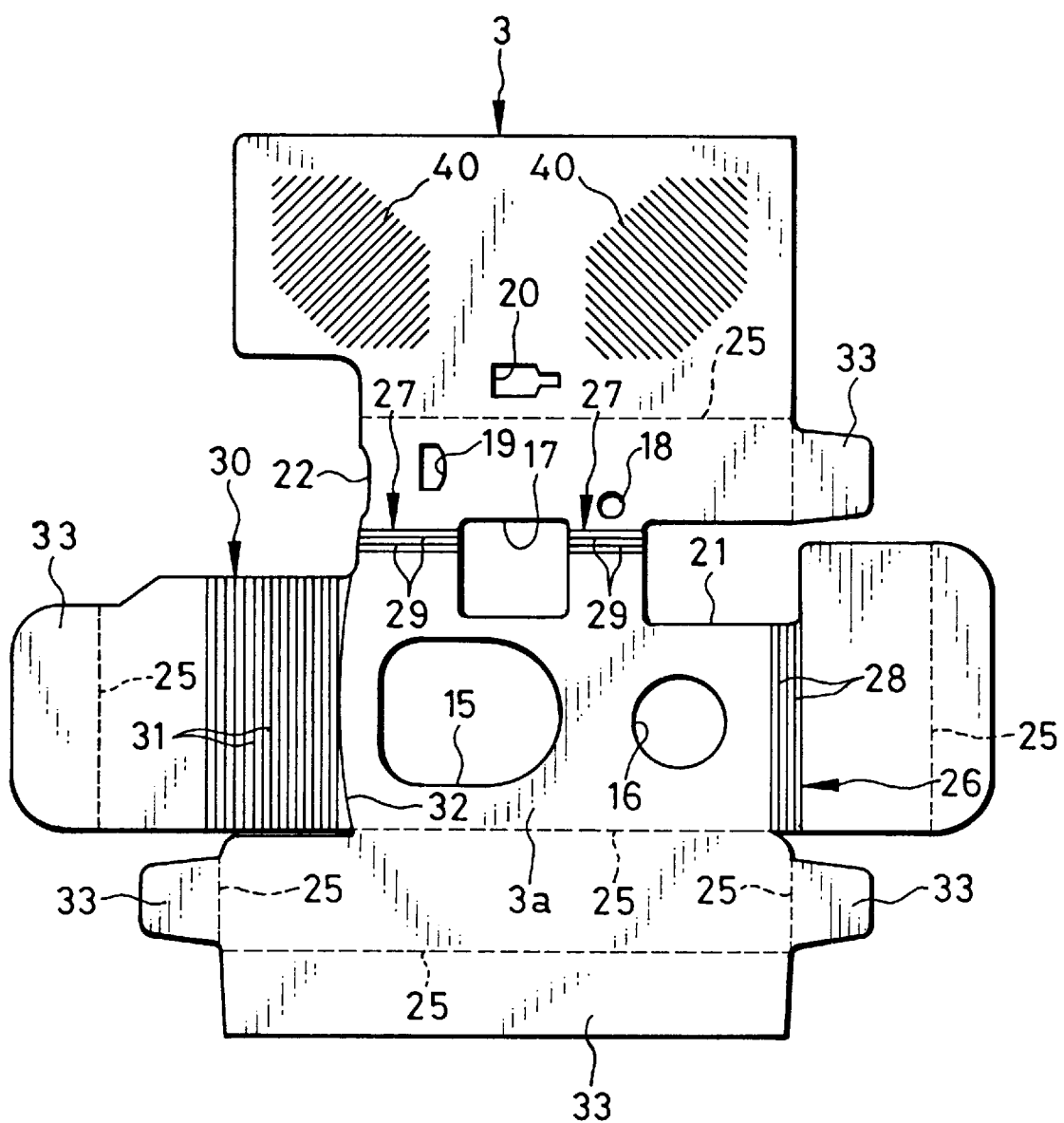
FIG. 3 is an exploded or unfolded view of the outer case of the first embodiment.

As shown in FIG. 3, the outer case 3 is made of a blanked sheet, e.g., cardboard or plastic sheet. To wrap the unit body 2, the sheet is folded along straight lines 25 shown by dotted lines to form rectangular corners, and is bent to form curved or rounded corners in those portions 26 and 27 which cover the rounded corners 23 and 24 of the unit body 2.

To improve the flexibility of the sheet in the bending portions 26 and 27, there are provided a plurality of grooves 28 and 29 in axial directions of the respective curves. The grooves 28 and 29 may be formed by knurling or pressing the sheet. Also, a portion 30 for covering the grip 5b is provided with a plurality of grooves 31, for example, by knurling or pressing the sheet. The grooves 31 extend axially to the curve of the grip 5b and improve flexibility of that portion 30. Because of the improved flexibility, these portions 26, 27 and 30 can tightly fit the curved surfaces 23, 24 and 5b of the unit body 2. The grooves 31 also prevent the fingers from slipping.

In correspondence with the concave of the grip 5b in the border area to the front wall 5, a curved or arc-shaped folding line 32 is provided along the border line between the grip 5b and the front wall 5a. The curvature of the folding line 32 is determined such that the front wall 3a of the outer case 3 tightly fits the convex front wall 5a of the unit body 2, and that the portion 30 tightly fits the grip 5b. Thus, the outer case 3 does not remove off the unit body 2 even in the border between the front wall 5a and the grip 5b. Therefore, the grip cover portion 30 permits secure holding of the film unit 1. Portions 33 are pasting margins.

The outer case 3 is further provided with grooves 40 in those portions where the photographer grips the film unit 1, to increase the friction between the fingers and the film unit 1. The grooves 40 also decrease the stiffness and resiliency of the outer case 3 in those portions to permit secure holding of the film unit 1. Thus, the outer case 3 does not swell off the unit body 2, so the unit body 2 is reliably protected from dust.

The grooves 31 are provided in the entire area of the portion 30 to be bent to form a curved surface, and the grooves 28 and 29 are provided in the entire area of the portions 26 and 27. These grooves 28, 29 or 31 are determined to have a pitch of 0.5 mm to 5.0 mm and a depth of 0.1 mm to 1.0 mm, according to the height and width of the curved portions 23, 24 and 5b. Since the sheet for the outer case of the film unit has conventionally been cardboard of 200 g/m² to 400 g/m² weight, the depth of the grooves 28, 29 and 31 is preferably from 0.2 mm to 0.8 mm. The above described pitch range and depth range apply to the groove 40. Each groove may be of V-shape or U-shape in section depending upon the pitch, depth and width thereof, and the weight of the sheet as well.

When wrapping the unit body 2 in the outer case 3, the unit body 2 is put on the rear side of the unfolded outer case 3 to insert the lens hood 5f in the opening 15. Then, the outer case 3 is folded along the folding line 32, and the grip cover portion 30 is curved to fit the grip 5b. Also, the portions 26 and 27 are bent to curve tightly around the rounded corners 23 and 24. Thereafter, the outer case 3 is folded along the folding lines 25. After wrapping up the whole sides of the unit body 2 in this way, the outer case 3 is secured in the pasting margins 33 appropriately.

Figure 4:
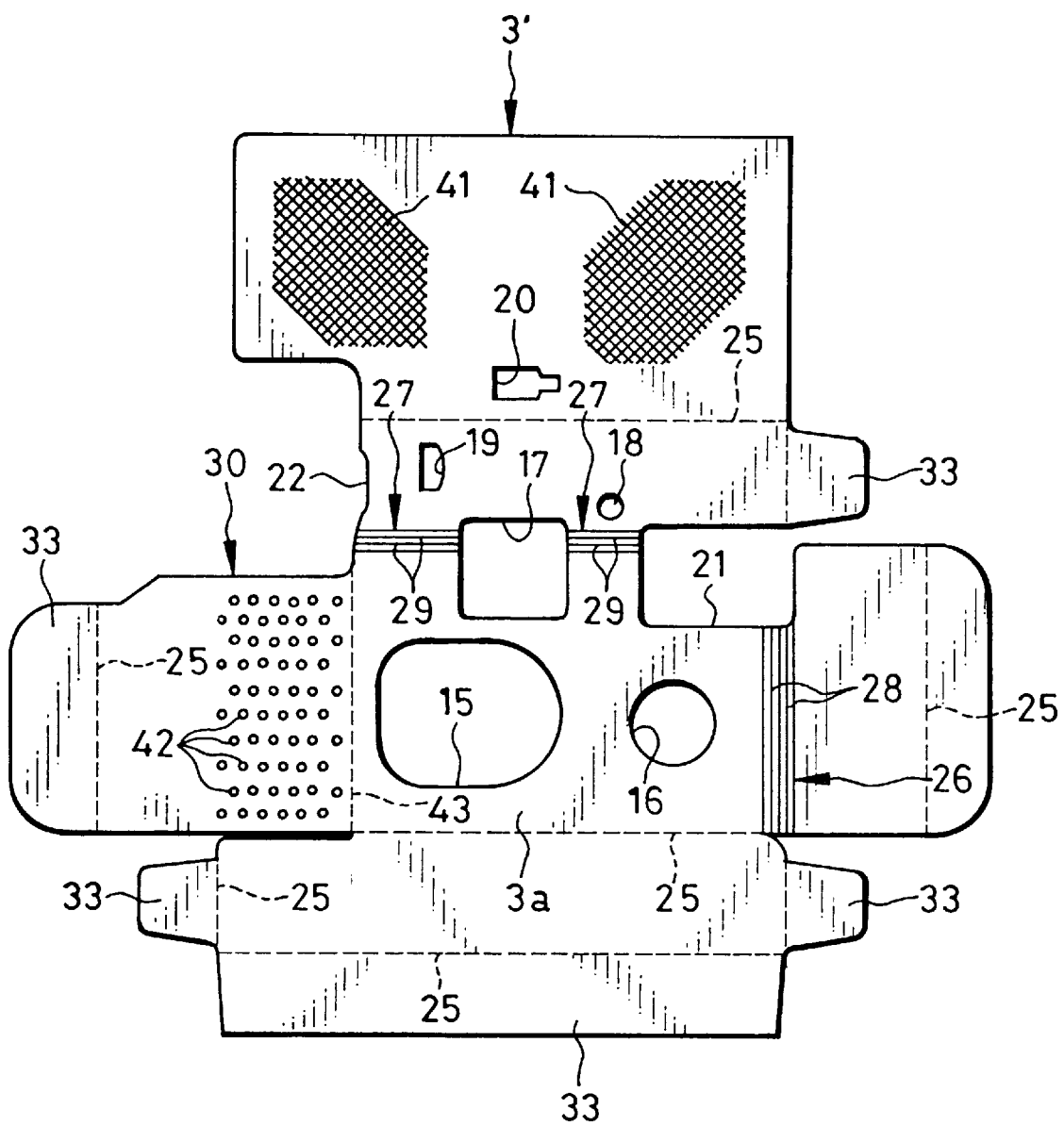
FIG. 4 is an exploded or unfolded view of an outer case according to a second embodiment of the invention.

The parallel grooves 28, 29 and 31 may be replaced by latticed grooves 41 as shown in FIG. 4. The pitch of the latticed grooves 41 may be about 1 mm to 10 mm. It is possible to indent the sheet in the curved portion with a plurality of circles, i.e. round recesses 42, of about 1 mm to 10 mm in diameter, instead of the grooves. The grooves may also be replaced by ribs. It is also possible to emboss the sheet with another pattern such as the grain of wood or stone, so as to obtain the same effect as the grooves 28, 29 and 31.

The unit body may have a flat front wall, and also the grip need not always have a concaved border area. For that unit body, a straight folding line 43 is provided in an outer case 3' along a straight border line between the front wall and the grip, as shown in FIG. 4.

It is possible to half-cut or perforate the sheet along one or more of the folding lines, so as to facilitate folding.

It is possible to make other sides of the unit body convex than the front side, and process the outer case such that the corresponding portion of the outer case can curve to fit the unit body.

As described so far, according to the invention, the outer case always tightly contacts the unit body. Therefore, the film unit is improved in appearance and handling. Also, the dust or the like cannot easily enter between the outer case and the unit body.

While the present invention has been described with respect to the preferred embodiment shown in the drawings, the present invention is not limited to the above-described embodiments, but on the contrary, various modifications may be possible without departing from the scope of the appended claims.

What is claimed is:

1. A lens-fitted photographic film unit wherein a unit body containing a roll of photographic film has a taking lens, an exposure mechanism and at least a curved surface, and is encased in an outer case which is made of a sheet material, said sheet material having structure in a bent portion covering said curved surface of said unit body to impart a flexibility to said bent portion which is greater than the flexibility of the sheet material of said outer case other than said bent portion, said unit body having a grip protruding forward from a front wall thereof;

wherein said front wall is convex in a vertical direction, and said sheet material of said outer case is folded along a curved folding line in correspondence with a border line between said grip and said front wall of said unit body.

2. The lens-fitted photographic film unit according to claim 1, wherein said structure comprises a plurality of grooves.

3. The lens-fitted photographic film unit according to claim 2, wherein said grooves extend axially to said curved surface.

4. The lens-fitted photographic film unit according to claim 3, wherein said grooves are spaced at 0.5 mm to 5.0 mm, and have a depth of 0.1 mm to 1.0 mm.

5. The lens-fitted photographic film unit according to claim 4, wherein said sheet material is 200 g/m² to 400 g/m² weight.

6. The lens-fitted photographic film unit according to claim 2, wherein said grooves are arranged in the form of a lattice.

7. The lens-fitted photographic film unit according to claim 1, wherein said front wall is also convex in a horizontal direction, said grip being concave in a border area to said front wall.

8. The lens-fitted photographic film unit according to claim 1, wherein said unit body has at least a rounded corner.

9. The lens-fitted photographic film unit according to claim 1, wherein said structure comprises a plurality of grooves that are parallel to each other and perpendicular to said end edges.

10. The lens-fitted photographic film unit of claim 1, wherein said structure comprises a plurality of circular recesses.

* * * * *